UNITED STATES PATENT OFFICE.

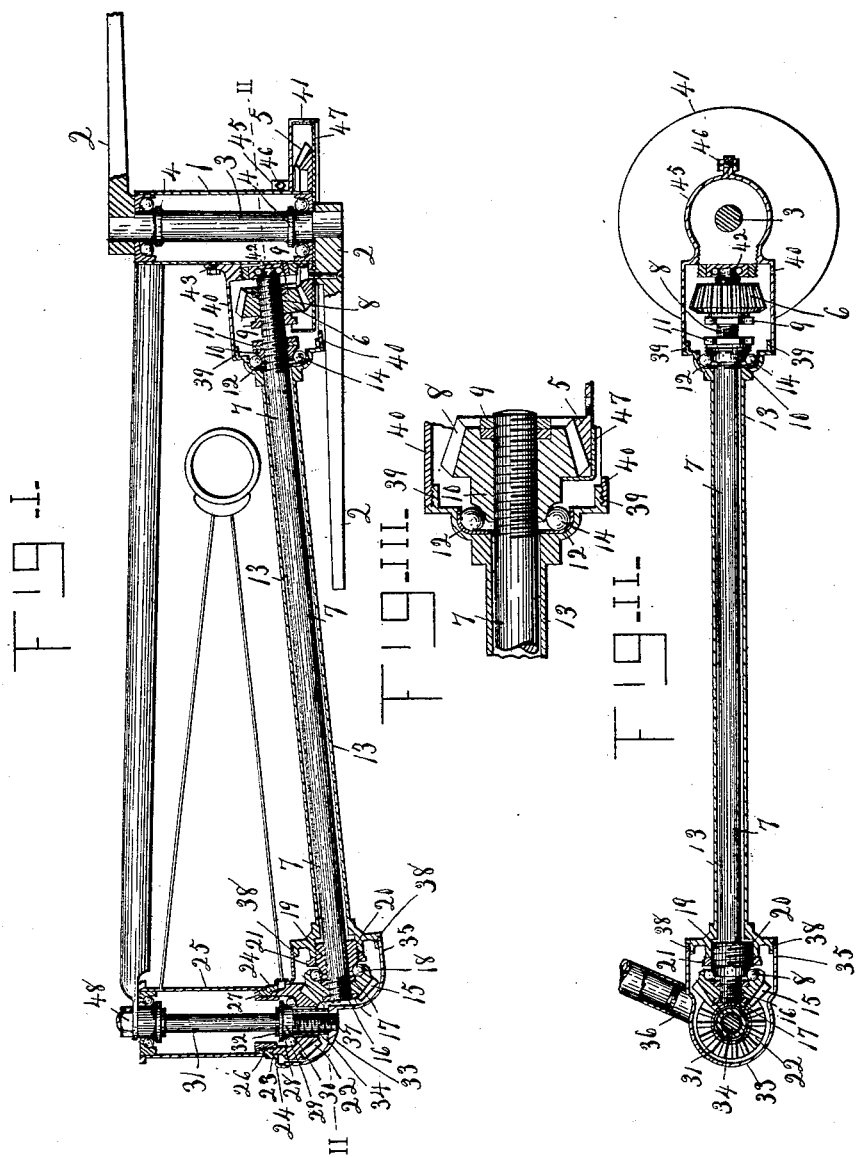

ROBERT F. DARLING, OF SYRACUSE, NEW YORK; EVA L. DARLING, ADMINISTRATRIX OF SAID ROBERT F. DARLING, DECEASED, ASSIGNOR TO THE BEVEL GEAR WHEEL COMPANY, OF NEWARK, NEW JERSEY, AND HARTFORD, CONNECTICUT.

BICYCLE.

SPECIFICATION forming part of Letters Patent No. 631,063, dated August 15, 1899.

Application filed April 2, 1897. Serial No. 630,376. (No model.)

*To all whom it may concern:*

Be it known that I, ROBERT F. DARLING, a citizen of the United States, residing at Syracuse, in the county of Onondaga and State of New York, have invented a new and useful Improvement in Chainless Bicycles; and I do hereby declare that the following, in connection with the accompanying drawings, is a full, clear, and exact description of the invention.

My invention relates to improvements in chainless bicycles in which the power from the pedals is communicated to the rear wheel by a shaft arranged in one of the side tubes or rear-fork sides carrying a bevel-pinion on each end, which engage, respectively, with a bevel-gear secured to the crank-shaft and another bevel-gear secured to the rear hub. My special construction of driving mechanism is simple, and with it the bicycle is made light, strong, and rigid, avoiding a multiplication of parts, particularly of ball-bearings. The tread is narrow and the parts are easily assembled and taken apart and are easily adjustable.

My invention will be better understood by reference to the accompanying drawings, in which the driving mechanism and arrangement of the gears is shown and only so much of the frame of the bicycle as is necessary.

Figure I is a horizontal longitudinal section through the crank-hanger, rear hub, and right-hand side tube. Fig. II is a corresponding vertical longitudinal section taken through the right-hand side tube and end of rear axle on line II II of Fig. I. Fig. III is a somewhat-enlarged section of the front end of the driving-shaft and attached pinion, showing a simple modification.

In the figures the same numerals of reference designate the same parts in all the views.

1 indicates the crank-hanger tube, and 2 2 the pedals, secured to the crank-shaft 3, carrying ball-races 4 4 and the pedal-gear 5, arranged to engage inwardly and rearwardly with the front pinion 6, secured adjustably on the connecting-shaft 7 by means of the thread 8 and lock-nuts 9 9.

10 is the cone of the front shaft-bearing, also adjustable on said thread; 11, its lock-nut; 12, a corresponding cup on front end of side tube 13, and 14 14 the balls.

15 is the rear pinion, secured adjustably on shaft 7 by means of thread 16 and lock-nuts 17 17 and formed on its front face into a cup, which, with balls 18 and cone 19, forms the rear shaft-bearing. This cone is secured by thread 20 and lock-nut 21 into rear end of side tube, the shaft turning freely in the cone.

22 is the rear gear, secured by thread 23, preferably right-handed, into the ring 24, formed with a flange and shoulder to receive the spokes and to fit against the end of the hub 25. The rear gear having been screwed into said flanged ring, they are both secured to the hub by means of the thread 26, preferably left-handed, formed on interior ring 27, secured in the hub, thus making a tight and strong joint.

28 is the cup formed on the interior of gear 22, 29 balls, and 30 cone, screwed on axle 31 against shoulder 32. Between cone 30 and box 33 of rear-gear case is arranged tube 34. This rear-gear case is formed integrally of box 33, box 35, and lug 36, to which is secured rear brace from seat-post. It is secured to end of axle 31 by thread 37 and is fitted within the outer end of flanged ring 24, forming a joint practically dust-tight. At 38 rear-gear case is threaded, with which engages thread on rear end of side tube, and at 39 front-gear case is reversely threaded, with which side tube engages, so that side tube 13, with inclosed shaft and connected parts, may be detached from frame or attached thereto by rotation in one direction or the other. The front-gear case is formed integrally of a cylindrical rearwardly-extending box 40 for receiving the front pinion and front end of the side tube and with a larger cylindrical box 41, encircling the crank-hanger for receiving the front gear, and also on its interior with the end ball-bearing 42 for the front end of shaft 7. This front-gear case is secured to the crank-hanger by any desirable means, as by screw 43 or lugs on an integral band 45, encircling the crank-hanger and drawn together by bolt 46.

47 is a dust-cap, preferably of celluloid or other light and transparent material, fitting within the box 41 and secured in position between the pedal 2 and the front gear 5. Other parts of the bicycle—such as the left rear-fork side, spokes, rim, tire, &c.—are sufficiently indicated, but it is not necessary to number them.

The driving mechanism is easily taken apart by loosening the left-hand nut 48 and disengaging axle 31 from left rear-fork side and then turning side tube 13, so as to unscrew it at 38 and 39. In my construction the pinions and bearings are easily adjustable, particularly the front pinion 6. When it is desirable to change the gear of the bicycle, the front or pedal gear 5 is changed and the pinion 6 adjusted forward or back on the shaft to engage therewith. When a bicycle is desired with fixed gear, the construction may be still further simplified by omitting the end ball-bearing 42 and forming the pinion 6 integral with the cone 10, permitting the limited amount of adjustment necessary for tightening or loosening the bearing.

Having thus fully described my invention, what I claim, and desire to protect by Letters Patent, is—

1. In the driving mechanism of a bicycle, the combination of the frame, the crank-hanger, the crank-shaft and pedals supported thereon, a bevel-gear secured to the shaft; a rotating connecting-shaft arranged in one of the side tubes; a pinion secured adjustably on the front end of said connecting-shaft engaging the said gear on its inner face and rear side; a second pinion secured adjustably on the rear end of said connecting-shaft engaging with the outer face and front side of a bevel-gear on the rear hub; a shouldered band, to which the spokes are attached, threaded to be secured to an inward extension on said bevel-gear, said band and extension being interiorly threaded for securing both to a threaded ring secured on the interior of said rear hub.

2. In the driving mechanism of a bicycle, the combination of the crank-hanger, crank-shaft and pedals, a bevel-gear secured to said shaft; a rotating connecting-shaft arranged in one of the rear side tubes threaded on its front and rear ends, a pinion threaded to be secured adjustably on the front end of said connecting-shaft, and engaging forwardly and outwardly with said gear, lock-nuts for retaining said pinion in the desired position on the shaft; a cone threaded to be secured adjustably on said shaft, a lock-nut therefor, a corresponding cup on the front end of the side tube; a second pinion threaded to be secured adjustably on the rear end of said connecting-shaft, lock-nuts therefor; a cone secured in the rear end of said side tube, and a corresponding cup formed in the front face of said rear pinion; a bevel-gear secured to rear hub engaging outwardly and forwardly with the rear face of said rear pinion; a band formed with shoulders to receive the spokes and to engage with the end of the hub, and with an inner thread to engage with a corresponding thread on an inner extension on said rear gear; a threaded ring secured in the interior of the rear hub and threaded to engage with said band and said extension; front and rear gear cases formed each integrally of two cylindrical parts arranged substantially at right angles to each other, in the front-gear case, the two parts of unequal diameter, and in the rear-gear case the two parts substantially equal in diameter, and a celluloid dust-cap fitted to the interior of the larger member of said front-gear case and secured between said front bevel-gear and the pedal, substantially as described and shown.

In witness whereof I have hereunto set my hand, in the presence of two attesting witnesses, at Syracuse, in the county of Onondaga, in the State of New York, this 13th day of March, 1897.

ROBERT F. DARLING.

Witnesses:
FRANK E. PITTS,
M. ELLA SKINNER.